(12) United States Patent
Andersen

(10) Patent No.: US 6,732,906 B2
(45) Date of Patent: May 11, 2004

(54) TAPERED TOWER MANUFACTURING METHOD AND APPARATUS

(76) Inventor: John I. Andersen, 3125 N. Yellowstone Hwy., Idaho Falls, ID (US) 83401

(*) Notice: Subject to any disclaimer, the term of this patent is extended or adjusted under 35 U.S.C. 154(b) by 0 days.

(21) Appl. No.: 10/118,074

(22) Filed: Apr. 8, 2002

(65) Prior Publication Data

US 2003/0189080 A1 Oct. 9, 2003

(51) Int. Cl.$^7$ .................. B21D 39/02; B23K 37/00; B23K 31/02
(52) U.S. Cl. .................. 228/145; 228/17.7; 228/173.4; 228/173.7; 219/62
(58) Field of Search ................ 228/17.5, 17.7, 228/145, 173.4, 173.7; 72/49, 50; 219/62

(56) References Cited

U.S. PATENT DOCUMENTS

| | | | | |
|---|---|---|---|---|
| 3,030,488 A | * | 4/1962 | Kuckens .................. 219/62 |
| 3,247,692 A | * | 4/1966 | Davis ....................... 72/49 |
| 3,263,321 A | * | 8/1966 | Lombardi .............. 29/429 |
| 3,269,005 A | * | 8/1966 | Smith et al. ............ 228/145 |
| 3,358,112 A | * | 12/1967 | Timmers ................ 219/612 |
| 3,601,570 A | * | 8/1971 | Davis ..................... 219/62 |
| 3,997,097 A | * | 12/1976 | Embury .................. 228/7 |
| 4,058,996 A | * | 11/1977 | Schaefer et al. .......... 72/49 |
| 4,082,211 A | * | 4/1978 | Embury .................. 228/145 |
| 4,501,948 A | * | 2/1985 | Yampolsky et al. ... 219/121.63 |
| 4,640,453 A | * | 2/1987 | Oe et al. ................ 228/17.7 |
| 5,020,351 A | * | 6/1991 | Castricum ............. 72/70 |
| 6,192,726 B1 | * | 2/2001 | Castricum ............. 72/49 |
| 2001/0018839 A1 | * | 9/2001 | Miller et al. ........... 72/49 |

FOREIGN PATENT DOCUMENTS

JP          32520          2/1983

* cited by examiner

Primary Examiner—M. Alexandra Elve
(74) Attorney, Agent, or Firm—Kirton & McConkie; Dale E. Hulse; David B. Tingey

(57) ABSTRACT

Method and apparatus for the manufacture of large-diameter, elongated, generally conical members in a continuous operation.

20 Claims, 5 Drawing Sheets

TAPERED TOWER MANUFACTURING METHOD AND APPARATUS

BACKGROUND OF THE INVENTION

1. Field of the Invention

This invention is related to the manufacture of large-diameter, elongated, generally conically shaped members.

2. State of the Art

Large-diameter, elongated, cylindrically shaped members are formed by rolling a strip of desired thickness and continuously welding the edge of the strip, thereby forming the member. While this method is acceptable for cylindrically members, it is not acceptable for forming large-diameter, elongated, conically shaped members. Such tapered, elongated members can be used for line support cross-country electrical power transmission and as tapered support towers for wind power generation.

These tapered towers are typically formed from a plurality of conically shaped members welded together to form the tapered tower of the desired length. Each individual conically shaped member is formed from a flat plate which has been cut, rolled and welded into the desired conically shaped member. The conical sections are then welded together at their tops and bottoms to form the tapered lower of the desired length. This fabrication technique is time consuming, wastes material through scrap from cutting the flat plate and is labor intensive.

SUMMARY OF THE INVENTION

The present invention is directed to a method and apparatus for the manufacture of large-diameter, elongated, generally conical members. More specifically, the present invention is directed to a method and apparatus for the manufacture of tapered support towers in a continuous operation.

The method and apparatus of the present invention will be more fully understood when the drawings are taken in conjunction with the description of the invention set forth hereafter.

DESCRIPTION OF THE INVENTION

Figure 1:
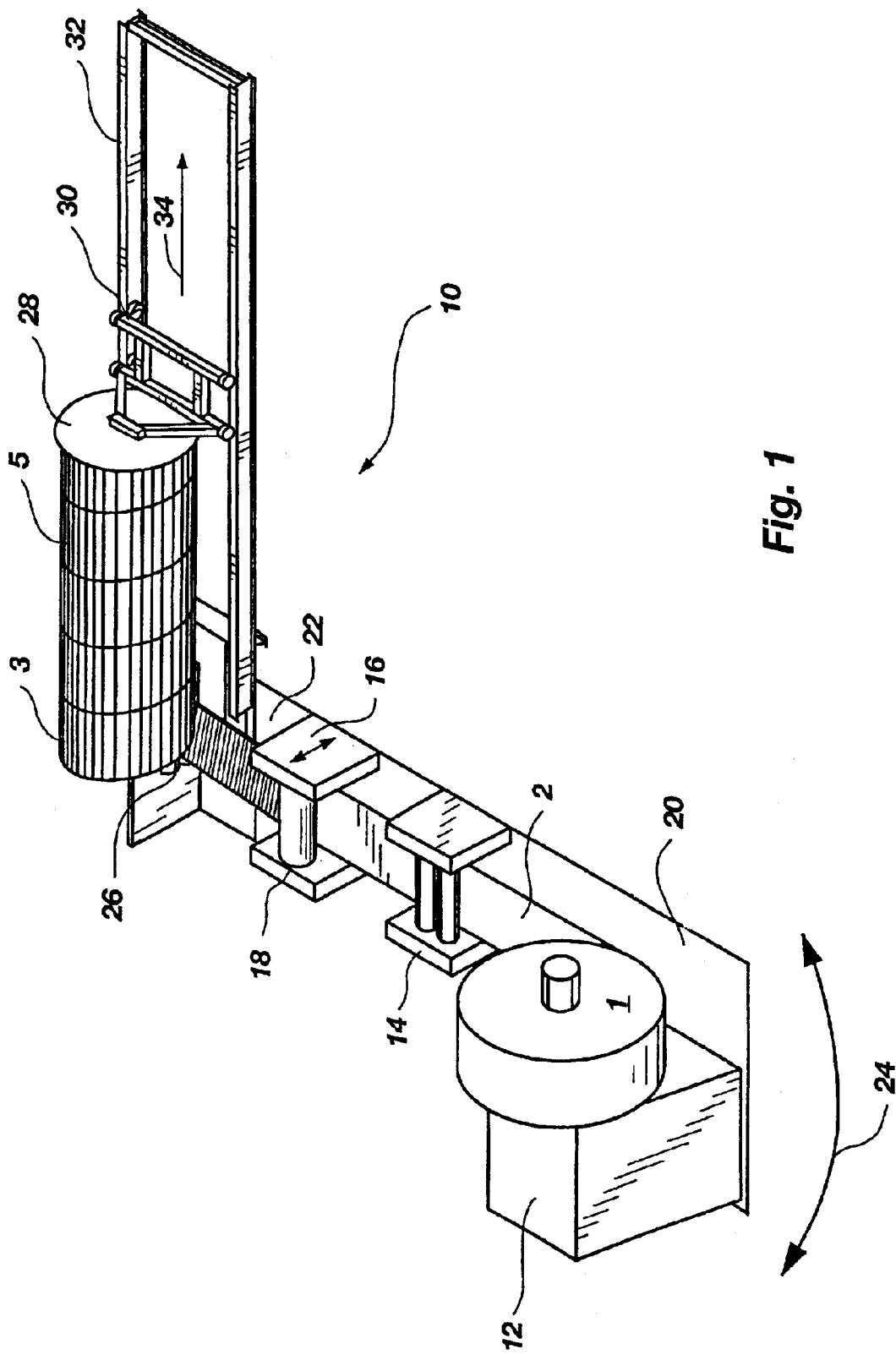
FIG. 1 is a view of the apparatus of the present invention.

Referring to drawing FIG. 1, the apparatus 10 of the present invention is shown. A decoiler 12 for rolls of steel 1 is provided. The decoiler preferably is capable of handling 50,000 pound coils of 48 inch width and ⅜ inch thick steel strip. Such a decoiler is commercially available from Cauffiel Machinery of Toledo, Ohio.

As the steel strip 2 from roll 1 is fed from the decoiler 12, it passes through a leveling apparatus 14 to straighten the strip 2. The leveling apparatus can be any suitable commercially available type, such as from Cauffiel Machinery of Toledo, Ohio. The leveling apparatus 14 comprises a plurality of cylindrical rollers extending the width of the strip 2 above and below to remove any residual curvature in the strip 2 after removal from the roll 1.

Next, the strip 2 passes between a pair of corrugated rolls 18 of a corrugating apparatus 16. As shown, the rolls 18 are located above and below the strip 2, passing therebetween. Each end of each roll 18 is vertically adjustable within the corrugating apparatus 16 to control and vary the amount of crimping corrugations in the strip 2. The crimping roll 18 design may vary from time to time depending upon the type of tapered tower to be produced. The pitch of the corrugations to be formed in the strip 2 may be varied as well as the depth of the corrugations. The corrugating apparatus 16 is typically computer controlled to effectively control and vary the amount of crimping of the strip 2 across the width thereof. The speed of the corrugating apparatus 16 is variable as desired during operation.

The decoiler 12, leveling apparatus 14 and corrugating apparatus 16 are mounted on a common base member 20 which is capable of pivoting about end 22 thereof in the directions indicated by arrow 24, the purpose of which will be explained later, to control the helix angle of the strip as it forms the tapered tower 5, the rate of the pivoting of base member 20 about end 22 being computer controlled by any suitable commercially available computer.

After corrugation, the strip 2 passes between bending rolls 26 which bend or deform the strip 2 into the desired diameter. As with the corrugation rolls 18, the bending rolls are computer controlled separately to continuously vary the diameter of the strip 2 during bending. Associated with the bending rolls 26 are adjustable back rolls (not shown) to help bend or deform the strip 2 into the desired diameter to form the tapered tower. The back rolls may also be computer controlled, if desired. Also, associated with bending rolls 26 as part of a forming and welding head is a pair of welding heads (not shown) to weld both sides of the corrugated, deformed strip 2 to the previously corrugated, deformed, tapered, generally conical portion 3 to form a butt-welded or a lap-welded joint. Alternatively, after passing through the leveling apparatus 14 but before corrugation, roller apparatus 15 (FIG. 3D) can be used to deform strip 2 to produce a tapered cross-section. Any metal-forming apparatus known to one skilled in the art can be used for roller apparatus 15.

The design of the bending rolls 26 will vary depending upon the requirements and parameters of the tapered tower being constructed by the apparatus. Similarly, the welding heads comprise any suitable, commercially available heads, such as the 1000 ampere welding head from Lincoln Electric.

To support the tapered tower as it is formed, a tower support spindle 28 is movably mounted on carriage 30 which, in turn, is mounted on rails 32. The carriage 30 is longitudinally movable in the direction of arrow 34. The rails 32 can be any desired length based upon the length of the tapered tower 5 being formed.

Figure 2:
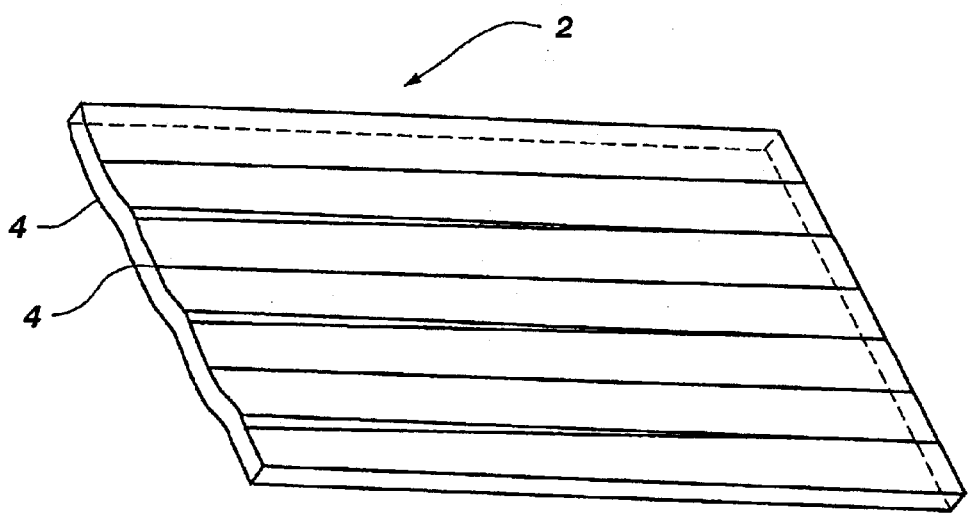
FIG. 2 is a view of a portion of the strip material after being crimped by the apparatus of the present invention.

Referring to drawing FIG. 2, the corrugated strip 2 is shown. The corrugated strip corrugations 4 which vary in depth from one side of the strip 2 to the other. The depths of the corrugations, and their variation from one side of the strip to the other side, determined the taper of the tapered tower being formed. Typically, the corrugations 4 will vary from the desired depth on one side of the strip 2 to substantially zero or no depth on the other side of the strip 2, as shown in FIG. 2.

Figure 3:
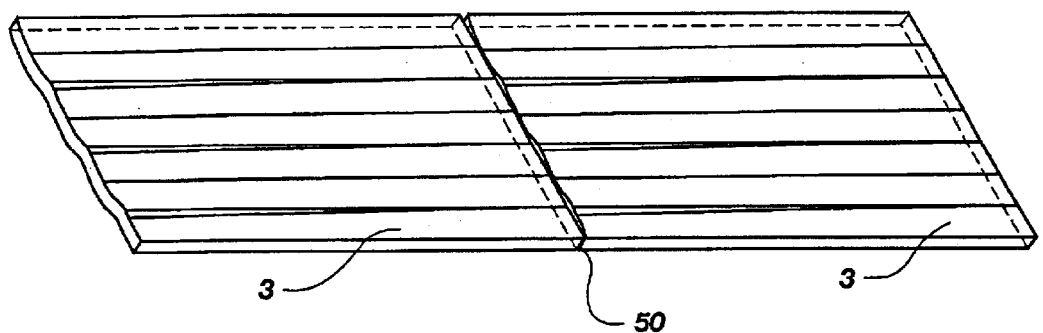
FIG. 3 is a view of a portion of a butt joint between adjacent conical portions forming the tapered tower.

Referring to drawing FIG. 3, a typical butt joint 50 between adjacent tapered, generally conical portions 3 forming a tapered tower 5 is shown. The butt joint 50 will be welded to form a continuous weld throughout the tapered tower 5 being formed.

Figure 3A:
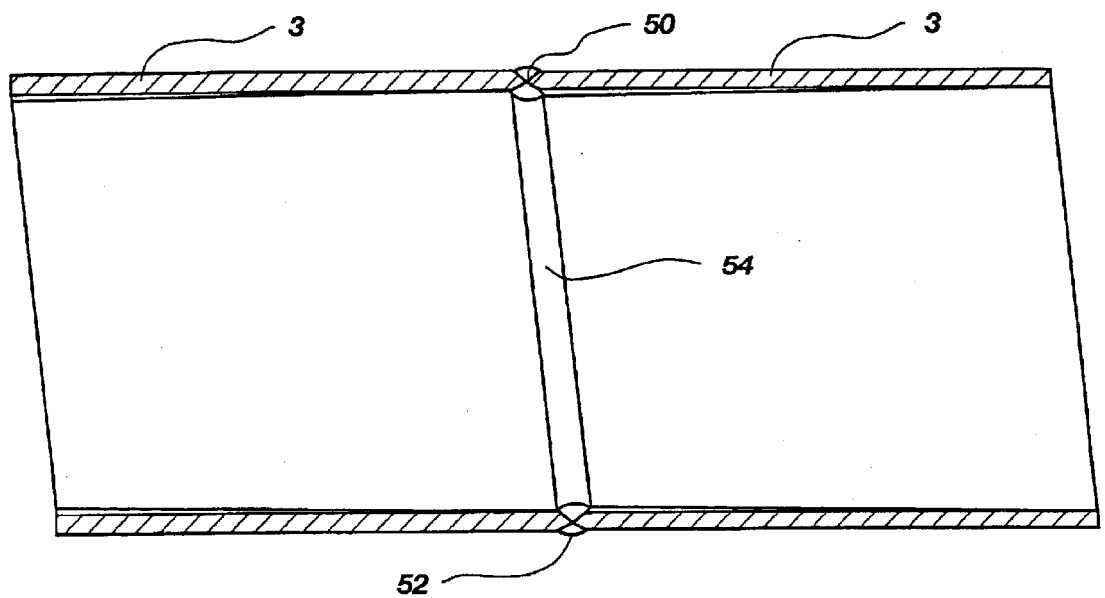
FIG. 3A is a view of a welded butt joint between adjacent conical portions forming the tapered tower.

Referring to drawing FIG. 3A, the butt joint 50 between adjacent, tapered, generally conical portions 3 forming a tapered tower 5 is shown in its preferred welded configuration. The butt joint 50 is welded on the exterior 52 and the interior 54 to form an integral butt-welded joint between adjacent conical portions 3.

Figure 3B:
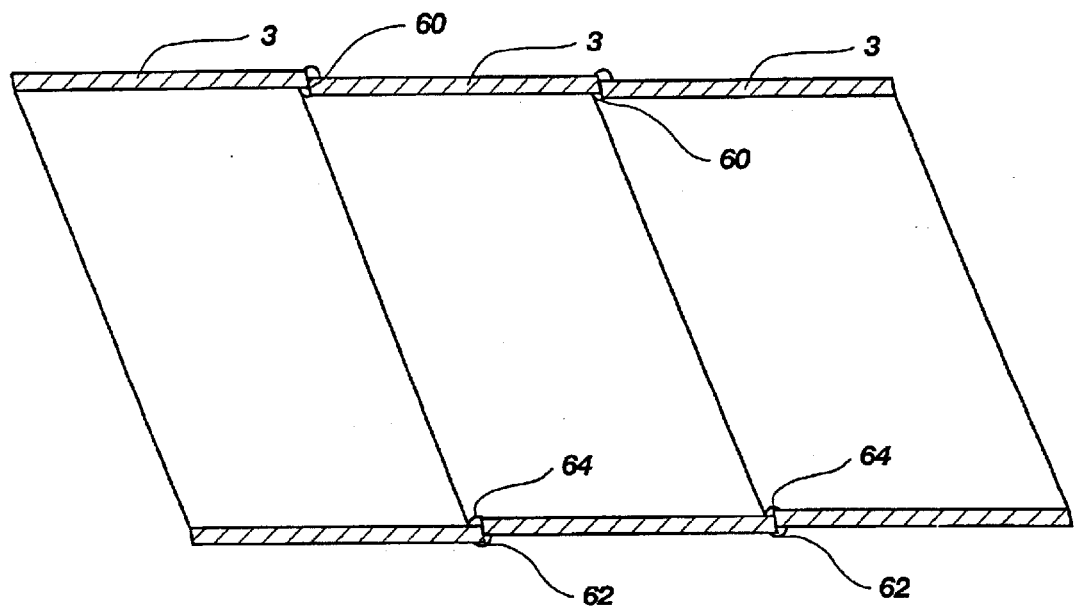
FIG. 3B is a view of a welded offset butt joint between adjacent conical portions forming the tapered tower.

Referring to drawing FIG. 3B, an offset welded butt joint 60 is shown between adjacent conical portions 3 forming a tapered tower 5. As shown, in an offset butt joint 60, each conical portion 3 is slightly offset a portion of the thickness of the strip material forming the conical portion 3. In the offset butt joint 60, the conical portions 3 are welded on the exterior 62 and interior 64 to form a continuous offset butt-welded joint 60 throughout the tapered tower 5 being formed.

Figure 3C:
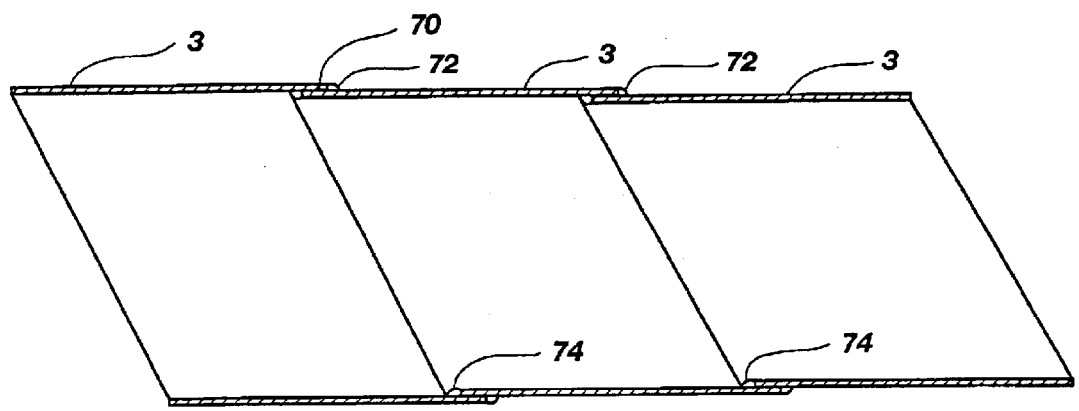
FIG. 3C is a view of a welded overlapped joint between adjacent conical portions forming the tapered tower.

Referring to drawing FIG. 3C, an overlapped joint 70 connecting adjacent conical portions 3 forming a tapered tower 5 is shown. At the overlapped joint 70, a portion of each conical portion 3 overlaps an adjacent conical portion being welded on the exterior 72 and interior 74 to form a continuous welded overlapped joint 70 throughout the tapered tower 5.

Figure 3D:
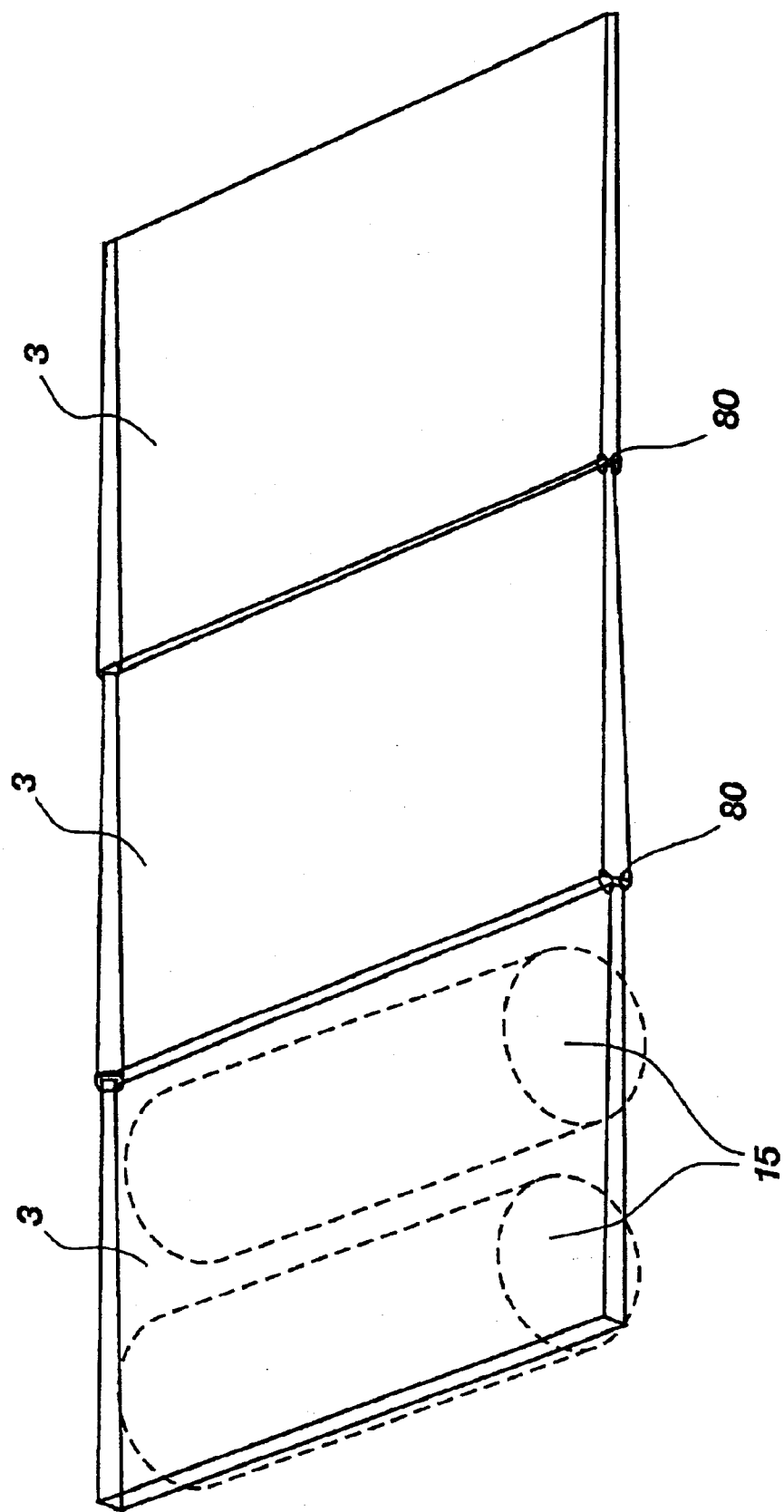
FIG. 3D is a view of a welded joint between adjacent tapered conical portions.

Referring to drawing FIG. 3D, alternatively, after passing through the leveling apparatus 14 but before passing through corrugation rolls 18, roller apparatus 15 can be used to deform strip 2 to produce a tapered cross-section. If the cross-section is tapered, as shown in FIG. 3D, strip 2 is then formed into a conical portion 3. It is then joined to another conical portion 3 by welding the reduced thickness portion of conical portion 3 to the unreduced thickness portion of another conical portion 3. A butt joint, offset butt joint, or overlapped joint can be used for welded joint 80.

Figure 4:
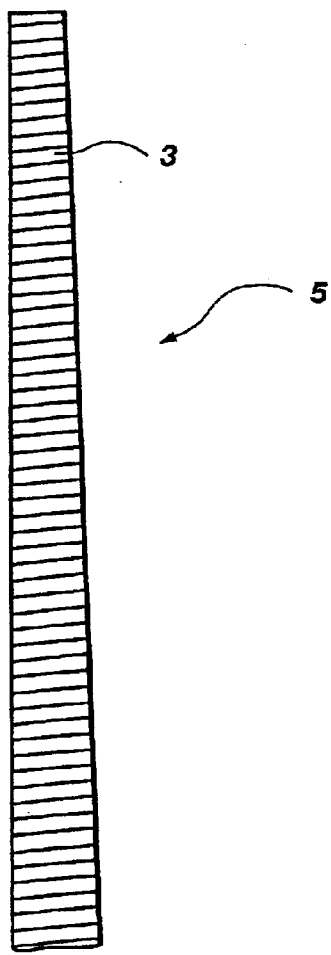
FIG. 4 is a view of a support tower formed by the method and apparatus of the present invention.

Referring to drawing FIG. 4, a tapered tower 5 formed of tapered, continuously helical conical portions 3 welded together is shown as a completed assembly.

METHOD OF OPERATION OF THE INVENTION

Referring again to drawing FIGS. 1 and 2, the method of operation of the invention will be described.

Initially, a coil 1 of desired thickness steel strip is placed on decoiler 12. The strip 2 is fed through leveling apparatus 14, between corrugating rolls 18 of corrugating apparatus 16, through bending rolls 26 and welding heads (not shown) to be wound on tower support spindle 28 supported by carriage 30. Alternatively, after passing through the leveling apparatus 14 but before corrugation, roller apparatus 15 can be used to deform 2 to produce a tapered cross-section. The depth of the corrugations 4 in the strip 2 and the variations of the depth thereof across strip 2 determine the helix angle of strip 2 forming the tapered tower 5 as well as the desired taper of the tower 5. To maintain the correct helix angle, the decoiler 12, leveling apparatus 14 and corrugating apparatus 16 mounted on member base 20 are pivoted on member base 20 about end 22 to maintain the corrugated strip 2 tangent to the control axis of the tapered tower 5 being formed. As the tapered tower 5 is being formed, the helix angle continuously changes or varies at a constant rate.

During formation of the tapered tower 5, since the rails 32 are preferably fixed, the central axis of the tower 5 being formed will slope downwardly at a rate equal to the slope angle of the side of the tapered tower being produced, thereby allowing the rails 32 to remain in a fixed horizontal position. This allows the strip 2 to remain in a horizontal transverse position before bending and welding, thereby eliminating any twisting of the strip 2 about its longitudinal axis. This simplifies the construction of the carriage 30 and rails 32 with respect to the apparatus mounted on base member 20, and the bending apparatus and welding apparatus which are also rigidly mounted. However, the tower support spindle 28 must be movable because it will assume an angle equal to the slope of the wall of the tapered tower 5 being formed.

A typical tapered tower formed by the apparatus and method of the present invention will be approximately 127 feet in length, having a diameter of 80 inches at the top and a diameter of 126 inches at the bottom. The corrugations having a 2 inch pitch from ridge to ridge formed transversely in the continuous strip of a 50,000 pound coil of ⅜ inch thick by 48 inches wide steel will vary from 0.199 inches at the top of the tower to 0.148 inches at the bottom of the tower. The helix angle of the strip being perpendicular in relation to the central axis of the tower changes from the top of the tower to the bottom thereof as the tapered tower is formed from the continuous metal strip. At the top of the tapered tower, the helix angle is approximately 10° and decreases to approximately 6° at the bottom of the tapered tower. The change in the helix angle is constant throughout the length of the tapered tower.

What is claimed is:

1. A metal-forming apparatus for forming a strip of metal into a tapered structural member, said apparatus comprising:
    a decoiler apparatus for supporting a coil of said metal strip thereon, wherein said metal strip includes a first edge and a second edge;
    a corrugating apparatus for corrugating said metal strip, said corrugations varying in depth from said first edge to said second edge of said metal strip;
    a plurality of bending rolls for deforming said metal strip into a portion of said tapered structural member; and
    a welding apparatus for welding said metal strip to form said tapered structural member.

2. The metal-forming apparatus of claim 1, wherein said decoiler apparatus and said corrugating apparatus are movably mounted with respect to said plurality of bending rolls.

3. The metal-forming apparatus of claim 2, wherein said decoiler apparatus and said corrugating apparatus are mounted upon a common bases which is movably mounted with respect to said plurality of bending rolls.

4. The metal-forming apparatus of claim 1, further comprising at least one of:
    a leveling apparatus for deforming said metal strip into a substantially flat strip; and
    a movable support to support said tapered structural member as it is being formed.

5. The metal-forming apparatus of claim 1, further comprising:
    a roller apparatus for tapering a cross-section of said metal strip.

6. The metal-forming apparatus of claim 1, wherein said moveable support comprises a structural support spindle mounted upon a carriage.

7. The metal-forming apparatus of claim 6, wherein said carriage is moveably mounted upon at least one rail extending in a direction substantially perpendicular to said metal strip.

8. The metal-forming apparatus of claim 1, wherein said corrugating apparatus includes a pair of adjustable corrugation rolls to corrugate said metal strip.

9. The metal-forming apparatus of claim 8, further comprising a computer device that is configured to selectively adjust said pair of adjustable corrugation rolls.

10. A method of forming a tapered structural member from a continuous metal strip having a first edge and a second edge thereof, said method comprising the steps of:

corrugating said continuous metal strip, the corrugations varying in depth from said first edge to said second edge of said metal strip;

deforming said corrugated metal strip into a portion of said tapered structural member; and welding said corrugated metal strip together to form said tapered structural member.

11. The method of claim 10, further comprising the step of:

providing a coil of said metal strip.

12. The method of claim 11, further comprising the step of:

leveling said metal strip after decoiling the coil of said metal strip and before the step of corrugating said metal strip.

13. The method of claim 10, further comprising the step of:

supporting said portion of said tapered structural member formed by said metal strip.

14. The method of claim 10, wherein the deforming step comprises:

deforming said corrugated metal strip into a helix.

15. The method of claim 10, wherein the step of welding said corrugated metal strip together comprises:

butt welding said corrugated metal strip together.

16. The method of claim 10, wherein the step of welding said corrugated metal strip together comprises:

butt welding said corrugated metal strip together wherein a portion of said corrugated metal strip is slightly offset from another portion of said corrugated metal strip.

17. The method of claim 10, wherein the step of welding said corrugated metal strip together comprises:

overlapping a portion of said corrugated metal strip with another portion of said corrugated metal strip and welding said portions together to form a lap-welded joint.

18. The method of claim 10, wherein said continuous metal strip is deformed into a tapered cross-section.

19. A method of forming a tapered structural member from a metal strip having a first edge and a second edge thereof, said method comprising:

corrugating said metal strip, the corrugations varying in depth from said first edge to said second edge;

deforming said corrugated metal strip into a portion of said tapered structural member; and welding said corrugated metal strip together to form said tapered structural member.

20. The method of claim 19, further comprising:

providing a coil of said metal strip; and leveling said metal strip after decoiling the coil of said metal strip and before corrugating said metal strip.

\* \* \* \* \*